(12) United States Patent
Van Den Bossche et al.

(10) Patent No.: US 9,005,739 B2
(45) Date of Patent: Apr. 14, 2015

(54) LAMINATED ARTICLES AND THEIR PRODUCTION

(75) Inventors: Linda M. Van Den Bossche, Zwijndrecht (BE); Nancy G. Vogelaers, Leefdaal (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 326 days.

(21) Appl. No.: 12/814,224

(22) Filed: Jun. 11, 2010

(65) Prior Publication Data

US 2011/0020615 A1    Jan. 27, 2011

Related U.S. Application Data

(60) Provisional application No. 61/227,997, filed on Jul. 23, 2009, provisional application No. 61/326,934, filed on Apr. 22, 2010.

(51) Int. Cl.
*B32B 27/32* (2006.01)
*B32B 27/08* (2006.01)
*B32B 27/36* (2006.01)
*B32B 3/10* (2006.01)
(Continued)

(52) U.S. Cl.
CPC ................. *B32B 37/04* (2013.01); *B32B 27/08* (2013.01); *B32B 27/32* (2013.01); *B32B 27/36* (2013.01); *B32B 37/185* (2013.01); *B32B 38/0008* (2013.01); *B32B 2307/412* (2013.01); *B32B 2310/14* (2013.01); *B32B 2323/10* (2013.01); *B32B 2425/00* (2013.01); *B32B 2429/00* (2013.01)

(58) Field of Classification Search
USPC .................................................. 428/515, 516
See application file for complete search history.

(56) References Cited

U.S. PATENT DOCUMENTS 4,357,376 A * 11/1982 Nattinger et al. ............ 428/34.9
4,540,753 A     9/1985 Cozewith et al.
(Continued)

FOREIGN PATENT DOCUMENTS

EP    0 129 368    12/1984
EP    0 277 004     8/1988
(Continued)

OTHER PUBLICATIONS

G. Ver Strate et al., "Near Monodisperse Ethylene-Propylene Copolymers by Direct Ziegler-Natta Polymerization. Preparation, Characterization, Properties", Macromolecules, 1988, vol. 21, pp. 3360-3371.
(Continued)

*Primary Examiner* — Ronak Patel
(74) *Attorney, Agent, or Firm* — Leandro Arechederra, III; Frank Reid; Kristina Leavitt (57) ABSTRACT

A laminated article comprises a substrate having opposite major surfaces, and a multi-layer lamination composition comprising (i) a base layer and (ii) an adhesion layer bonded to at least one surface of the base layer. The adhesion layer (ii) comprises a propylene copolymer which comprises units derived from propylene and from about 3 to about 25 wt % of units derived from ethylene and/or a $C_4$ to $C_8$ alpha-olefin and which has a melting temperature less than about 105° C. and a heat of fusion less than about 75 J/g. The lamination composition is thermally laminated to the substrate such that said adhesion layer (ii) is bonded to at least one major surface of said substrate.

11 Claims, 5 Drawing Sheets

(51) Int. Cl.
  *B32B 37/00* (2006.01)
  *B32B 38/00* (2006.01)
  *B32B 37/04* (2006.01)
  *B32B 37/18* (2006.01)

(56) References Cited

U.S. PATENT DOCUMENTS

| | | | |
|---|---|---|---|
| 5,198,401 | A | 3/1993 | Turner et al. |
| 5,391,629 | A | 2/1995 | Turner et al. |
| 6,048,950 | A | 4/2000 | Dolle et al. |
| 6,265,212 | B1 | 7/2001 | Fallaux et al. |
| 6,448,358 | B2 | 9/2002 | Siedle et al. |
| 6,559,262 | B1 | 5/2003 | Waymouth et al. |
| 7,281,360 | B1 * | 10/2007 | Larimore et al. ............... 53/452 |
| 2002/0004575 | A1 | 1/2002 | Cozewith et al. |
| 2004/0185230 | A1 * | 9/2004 | Rehkugler ................... 428/182 |
| 2004/0236042 | A1 | 11/2004 | Datta et al. |
| 2007/0082155 | A1 * | 4/2007 | Rehkugler et al. ........... 428/35.7 |
| 2008/0145670 | A1 * | 6/2008 | Song et al. ................... 428/420 |
| 2008/0261061 | A1 * | 10/2008 | Sasaki et al. ............... 428/474.9 |

FOREIGN PATENT DOCUMENTS

| | | |
|---|---|---|
| EP | 0 284 708 | 10/1988 |
| EP | 0 426 637 | 5/1991 |
| EP | 0 426 638 | 5/1991 |
| EP | 1 070 087 | 1/2001 |
| WO | WO 98/27154 | 6/1998 |
| WO | WO 03/040201 | 5/2003 |

OTHER PUBLICATIONS

L.M. Wheeler et al., "*Gel Permeation Chromatography/Fourier Transform Infrared Interface for Polymer Analysis*", Applied Spectroscopy, 1993, vol. 47, No. 8, pp. 1128-1130.

* cited by examiner

LAMINATED ARTICLES AND THEIR PRODUCTION

CROSS REFERENCE TO RELATED APPLICATIONS

This application claims the benefit of prior U.S. provisional application Ser. No. 61/227,997 filed Jul. 23, 2009 and U.S. provisional application Ser. No. 61/326,934 filed Apr. 22, 2010, both of which are hereby incorporated by reference in its entirety.

FIELD

This invention relates to laminated articles, particularly plastics laminated documents, and their production.

BACKGROUND

The lamination of substrates, such as documents, book covers, greeting cards, posters, postcards, brochure, catalogues, and identification cards, in a transparent plastics film is a promising market for polymer producers. Typically, the laminating material is an oriented polypropylene film or an oriented polyester film. In the past, laminating of documents with polymer films was achieved using solvent or water-based adhesives. However, adhesive lamination tends to be slow particularly with water-based adhesives, and, where solvents are involved, can raise environmental concerns.

More recently, therefore, focus has turned to alternative methods of lamination, such as extrusion coating, extrusion lamination and thermal lamination. In extrusion coating a bonding layer is extrusion coated onto a base film. In the document plastification application, the resulting composite film is thermally laminated onto the substrate by the application of heat and pressure. However, existing methods of extrusion coating generally require a primer to be applied to the base film to increase the strength of the bond between the bonding layer and the base film. There is therefore significant interest in the development of lamination systems that will operate without the use of primers. There is also interest in developing extrusion coating compositions that require lower temperatures and pressures in the thermal lamination step.

In our co-pending U.S. Provisional Application No. 61/227,997, filed Jul. 23, 2009, we have described a composite film comprising (a) a substrate layer and (b) a coating disposed on at least one side of the substrate, wherein the coating comprises a propylene copolymer which comprises units derived from propylene and from about 3 to about 25 wt % of units derived from ethylene and/or a $C_4$ to $C_8$ alpha-olefin and which has a melting temperature less than about 105° C. and a heat of fusion less than about 75 J/g. The polypropylene-based coating can be extrusion coated and/or laminated onto the substrate layer and exhibits good adhesion to the substrate layer without the need for a primer layer.

According to the present invention there is now provided a composition and process for producing a thermally laminated coating on a substrate, especially a document, which again can achieve a strong bond with the substrate without the use of a primer in the laminated coating. In addition, thermal lamination can generally be conducted at lower temperatures and pressures than with conventional lamination materials.

SUMMARY

In one aspect, the invention resides in a laminated article comprising:

(a) a substrate having opposite major surfaces; and
(b) a multi-layer lamination composition comprising (i) a base layer and (ii) an adhesion layer bonded to at least one surface of the base layer, the adhesion layer (ii) comprising a propylene copolymer which comprises units derived from propylene and from about 3 to about 25 wt % of units derived from ethylene and/or a $C_4$ to $C_8$ alpha-olefin and which has a melting temperature less than about 105° C. and a heat of fusion less than about 75 J/g,
wherein the lamination composition (b) is thermally laminated to the substrate (a) such that said adhesion layer (ii) is bonded to at least one major surface of said substrate (a).

Conveniently, the base layer (i) comprises an oriented polypropylene film or a polyester film.

Conveniently, the propylene copolymer of said adhesion layer (ii) comprises from about 5 to about 15 wt % of units derived from ethylene.

In one embodiment, the adhesion layer (ii) comprises a blend of said propylene copolymer with at least one further polymer selected from an ethylene vinyl acetate, ethylene methyl acrylate, ethylene butyl acrylate, ethylene ethyl acrylate, ethylene acrylic acid or ethylene metacrylic acid copolymer or ionomer or terpolymer. Conveniently, said blend comprises from about 30 wt % to about 97 wt % of said further polymer.

In another embodiment, the adhesion layer (ii) comprises a blend of said propylene copolymer with at least one further polymer selected from low density polyethylene, a metallocene-based plastomer, linear polyethylene or polypropylene. Conveniently, said blend comprises from about 10 wt % to about 80 wt % of said further polymer.

Conveniently, said lamination composition (b) is corona discharge treated prior to being thermally laminated to said substrate (a).

Conveniently, the substrate (a) is a document having information disposed on said at least one major surface.

Conveniently, the lamination composition (b) is transparent after the thermal lamination step.

In another aspect, the invention resides in a laminated article comprising:

(a) a substrate having opposite major surfaces; and
(b) first and second multi-layer lamination compositions each comprising (i) a base layer and (ii) an adhesion layer bonded to at least one surface of the base layer, the adhesion layer (ii) comprising a propylene copolymer which comprises units derived from propylene and from about 3 to about 25 wt % of units derived from ethylene and/or a $C_4$ to $C_8$ alpha-olefin and which has a melting temperature less than about 105° C. and a heat of fusion less than about 75 J/g,
wherein the substrate (a) is interposed between the first and second lamination compositions and the lamination compositions (b) are thermally laminated to each other and/or the substrate (a) such that the adhesion layers (ii) are bonded to said one major surfaces respectively of said substrate and/or to each other.

In a further aspect, the invention resides in a process for producing a laminated article, the process comprising:

(a) providing a substrate having opposite major surfaces;
(b) providing a multi-layer lamination composition comprising (i) a base layer and (ii) an adhesion layer bonded to at least one surface of the base layer, the adhesion layer (ii) comprising a propylene copolymer which comprises units derived from propylene and from about 3 to about 25 wt % of units derived from ethylene and/or a $C_4$ to $C_8$ alpha-olefin and which has a melting temperature less than about 105° C. and a heat of fusion less than about 75 J/g; and (c) with the adhesion layer (ii) of said lamination composition disposed in contact with at least one major surface of said substrate, applying heat and pressure to said lamination composition to cause said adhesion layer to bond to the substrate and thereby thermally laminate the substrate and the lamination composition.

In yet a further aspect, the invention resides in a process for producing a laminated article, the process comprising:

(a) providing a substrate having opposite major surfaces;

(b) providing first and second multi-layer lamination compositions each comprising (i) a base layer and (ii) an adhesion layer bonded to at least one surface of the base layer, the adhesion layer (ii) comprising a propylene copolymer which comprises units derived from propylene and from about 3 to about 25 wt % of units derived from ethylene and/or a $C_4$ to $C_8$ alpha-olefin and which has a melting temperature less than about 105° C. and a heat of fusion less than about 75 J/g;

(c) interposing the substrate between the first and second multi-layer lamination compositions with the adhesion layers (ii) of the lamination compositions disposed in contact with the opposite major surfaces of said substrate; and (d) applying heat and pressure to said lamination compositions to cause said adhesion layers to bond to the substrate and thereby thermally laminate the substrate and the lamination compositions.

In still yet a further aspect, the invention resides in a process for producing a laminated article, the process comprising:

(a) providing a substrate having opposite major surfaces;

(b) providing first and second multi-layer lamination compositions each comprising (i) a base layer and (ii) an adhesion layer bonded to at least one surface of the base layer, the adhesion layer (ii) comprising a propylene copolymer which comprises units derived from propylene and from about 3 to about 25 wt % of units derived from ethylene and/or a $C_4$ to $C_8$ alpha-olefin and which has a melting temperature less than about 105° C. and a heat of fusion less than about 75 J/g;

(c) interposing the substrate between the first and second multi-layer lamination compositions with the adhesion layers (ii) of the lamination compositions disposed adjacent, but extending at their periphery beyond, the opposite major surfaces of said substrate; and (d) applying heat and pressure to at least the peripheral portions of the lamination compositions to cause said adhesion layers (ii) to bond to each other and encapsulate the substrate.

Conveniently, the adhesion layer, or each adhesion layer is corona discharge treated before being bonded to the substrate.

DETAILED DESCRIPTION

Figure 1:
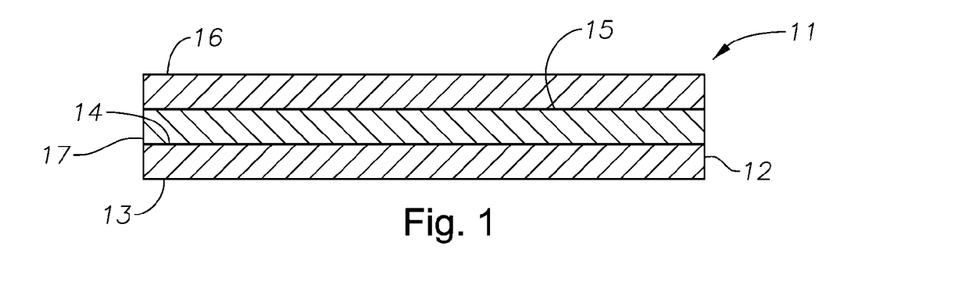
FIG. 1 is a cross-sectional diagram of a laminated article according to a first embodiment of the invention and including a substrate thermally laminated to a single multi-layer lamination composition.

Referring to FIG. 1, in a first embodiment the invention resides in a thermally laminated article 11 comprising a substrate 12 having opposite major surfaces 13, 14 and a multi-layer lamination composition 15 thermally laminated to the surface 14 of the substrate 12. The lamination composition 15 comprises a base layer 16 and an adhesion layer 17 bonded to one surface of the base layer 16. The lamination composition 15 is laminated to the substrate 12 such that the adhesion layer 17 is disposed adjacent, and is normally bonded to, said at least one major surface 14 of the substrate 12.

Figure 2:
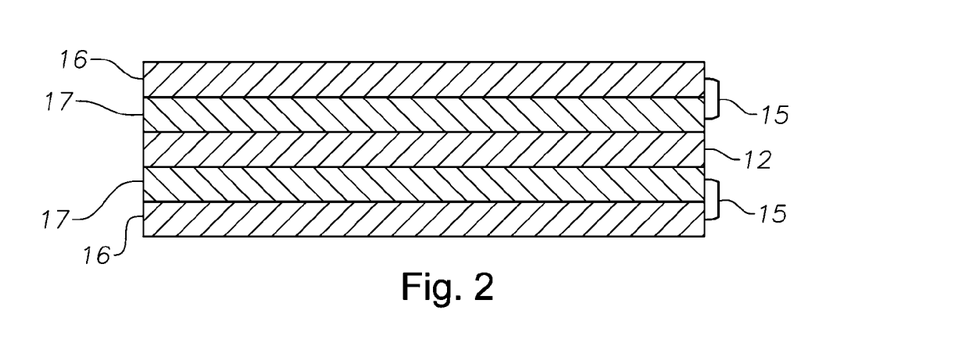
FIG. 2 is a cross-sectional diagram of a laminated article according to a second embodiment of the invention and including a substrate thermally laminated to two multi-layer lamination compositions.

Referring to FIG. 2, in a second embodiment, the substrate 12 is interposed between first and second multi-layer lamination compositions 15 each comprising a base layer 16 and an adhesion layer 17 bonded to one surface of the base layer 16. In this embodiment, the lamination compositions 15 are laminated to the substrate 12 such that their associated adhesion layer 17 are disposed adjacent, and are normally bonded to, the major surfaces 13 and 14 respectively of the substrate 12.

Figure 3:
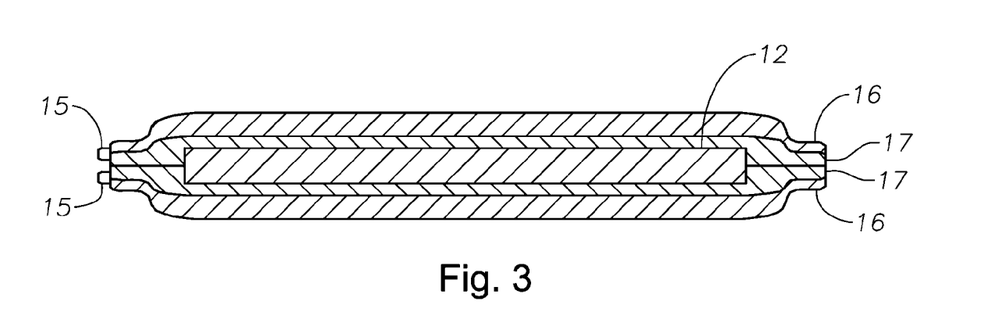
FIG. 3 is a cross-sectional diagram of a laminated article according to a third embodiment of the invention and including a substrate encapsulated between two thermally laminated multi-layer lamination compositions.

In a third embodiment, as shown in FIG. 3, the substrate 12 is again interposed between first and second multi-layer lamination compositions 15 each comprising a base layer 16 and an adhesion layer 17 bonded to one surface of the base layer 16. However, in this embodiment, the peripheral regions of the lamination compositions 15 project beyond the substrate 12 and the projecting peripheral portions of the adhesion layers 17 are thermally laminated together to encapsulate the substrate 12.

It is to be appreciated that FIGS. 1 to 3 are not drawn to scale since the substrate 12 is typically much thicker than the lamination composition 15.

Substrate

The substrate employed herein may be of any form and may be formed from any material known in the art for the formation of thermally laminated articles. In general, however, the substrate will be in the form of a sheet or a card, such as a document, book cover, greeting card, poster, postcard, brochure, catalogue, or identification card. The substrate may be formed from plastic, paper, cardboard, wood, metal, foil, or combinations thereof.

Typically, the substrate carries information printed or reverse printed thereon. By "reverse printed" is meant a process in which lettering, symbols, drawings, photographs, or other artwork is printed in a mirror image on the opposite side of a transparent substrate (the "back" side) from the side intended to be viewed by consumers or the end user (the "front" side). In this manner, when the substrate is viewed from the front side, the printed image shows through from the back side and is viewable in its intended orientation (i.e., no longer as a mirror image). Generally, where the substrate carries information, the lamination composition is applied to the substrate to protect the substrate without impairing the visibility of the information. It is therefore normally necessary that after thermal lamination the lamination composition is substantially transparent.

Multi-Layer Lamination Composition

The multi-layer lamination composition comprises a base layer and at least an adhesion layer disposed on at least one surface of the base layer.

The base layer is generally a polymeric material and in one preferred embodiment comprises a homopolymer or copolymer of propylene. The polypropylene may be unoriented, or may be uniaxially oriented in the machine or transverse direction, or may be biaxially oriented (i.e., in both the machine and transverse directions). As used herein, the phrase "oriented polypropylene" or "OPP" includes both homo- and copolymers of propylene and includes both uniaxially and biaxially oriented polypropylene substrates. In another preferred embodiment, the base layer comprises an oriented or unoriented polyester, such as polyethylene terephthalate.

The adhesion layer comprises a propylene-based copolymer, which comprises units derived from propylene and from about 3 to about 25 wt %, generally about 5 to about 15 wt %, of units derived from ethylene and/or a $C_4$-$C_8$ alpha-olefin. Suitable alpha-olefin comonomer units may derive from 1-butene, 1-hexene, 4-methyl-1-pentene and/or 1-octene. The propylene-based copolymer may be characterized by having a single melting temperature as determined by differential scanning calorimetry (DSC) of less than about 105° C., or less than about 100° C., or less than about 95° C., or less than about 90° C., or less than about 80° C., or less than about 70° C. The melting point is defined as the temperature of the greatest heat absorption within the range of melting of the sample. The propylene-based copolymer may show secondary melting peaks adjacent to the principal peak, but for purposes herein, these secondary melting peaks are considered together as a single melting point, with the highest of these peaks being considered the melting point (Tm) of the propylene-based copolymer.

In addition, the propylene-based copolymer may be characterized by a heat of fusion (Hf), as determined by DSC of less than about 75 J/g, or less than about 70 J/g, or less than about 60 J/g, or less than about 50 J/g, or less than about 30 J/g. Generally, the heat of fusion of the copolymer is at least about 0.5 J/g, or at least about 1.0 J/g, or at least about 1.5 J/g, or at least about 3.0 J/g, or at least about 4.0 J/g, or at least about 6.0 J/g, or at least about 7.0 J/g.

As used in this specification, DSC procedures for determining Tm and Hf include the following. The polymer is pressed at a temperature of from about 200° C. to about 230° C. in a heated press, and the resulting polymer sheet is hung, under ambient conditions, in the air to cool. About 6 to 10 mg of the polymer sheet is removed with a punch die and then this sample is annealed at room temperature for about 80 to 100 hours. At the end of this period, the sample is placed in a Differential Scanning Calorimeter (Perkin Elmer Pyris One Thermal Analysis System) and cooled to about −50° C. to about −70° C. The sample is heated at 10° C./min to attain a final temperature of about 200° C. The sample is kept at 200° C. for 5 minutes and a second cool-heat cycle is performed. Events from both cycles are recorded. The thermal output is recorded as the area under the melting peak of the sample, which typically occurs between about 0° C. and about 200° C. It is measured in Joules and is a measure of the heat of fusion (Hf) of the polymer. The melting point is recorded as the temperature of the greatest heat absorption with respect to a baseline within the range of melting of the sample.

The propylene-based copolymer can have a triad tacticity of three propylene units, as measured by $^{13}C$ NMR, of 75% or greater; 80% or greater; 82% or greater; 85% or greater; or 90% or greater. In one or more embodiments, ranges include from about 50 to about 99%, in other embodiments from about 60 to about 99%, in other embodiments from about 75 to about 99%, and in other embodiments from about 80 to about 99%. Triad tacticity is determined by the methods described in U.S. Patent Application Publication No. 2004/0236042.

Generally, the propylene-based copolymer of the adhesion layer has a crystallinity of from about 0.5% to about 40%, or from about 1% to about 30%, or from about 5% to about 25%, determined according to DSC procedures. Crystallinity may be determined by dividing the heat of fusion of a sample by the heat of fusion of a 100% crystalline polymer, which is assumed to be 189 joules/gram for isotactic polypropylene or 350 joules/gram for polyethylene.

Typically, the propylene-based copolymer has a density of from about 0.85 g/cm$^3$ to about 0.92 g/cm$^3$, or from about 0.87 g/cm$^3$ to about 0.90 g/cm$^3$, or from about 0.88 g/cm$^3$ to about 0.89 g/cm$^3$ at room temperature as measured per the ASTM D-792 test method.

Conveniently, the propylene-based copolymer has a melt index (MI) (ASTM D-1238, 2.16 kg @ 190° C.), of less than or equal to about 25 g/10 min, or less than or equal to about 17 g/10 min, or less than or equal to about 12 g/10 min, or less than or equal to about 10 g/10 min, or less than or equal to about 8 g/10 min.

In addition, the propylene-based copolymer typically has a melt flow rate (MFR), as measured according to the ASTM D-1238, 2.16 kg weight @ 230° C., equal to or greater than about 2 g/10 min, or at least about 4 g/10 min, or at least about 5 g/10 min, or at least about 10 g/10 min. In these or other embodiments, the melt flow rate may be equal to or less than about 350 g/10 min, or less than about 250 g/10 min, or less than about 100 g/10 min.

Conveniently, the propylene-based copolymer may have a Mooney viscosity [ML (1+4) @ 125° C.], as determined according to ASTM D-1646, of less than about 100, or less than about 75, or less than about 50, or less than about 30.

Generally, the propylene-based copolymer can have a weight average molecular weight (Mw) of from about 5,000 to about 5,000,000 g/mole, or from about 10,000 to about 1,000,000 g/mole, or from about 20,000 to about 500,000 g/mole, or from about 50,000 to about 400,000 g/mole; a number average molecular weight (Mn) of from about 2,500 to about 2,500,000 g/mole, or from about 5,000 to about 500,000 g/mole, or from about 10,000 to about 250,000 g/mole, or from about 25,000 to about 200,000 g/mole; and a Z-average molecular weight (Mz) of from about 10,000 to about 7,000,000 g/mole, or from about 50,000 to about 1,000,000 g/mole, or from about 80,000 to about 700,000 g/mole, or from about 100,000 to about 500,000 g/mole. In addition, the molecular weight distribution (MWD=(Mw/Mn)) of the propylene-based copolymer is normally from about 1 to about 40, or from about 1 to about 15, or from about 1.8 to about 5, or from about 1.8 to about 3.

Techniques for determining the molecular weight (Mn, Mw and Mz) and molecular weight distribution (MWD) may be found in U.S. Pat. No. 4,540,753 and in Macromolecules, 1988, volume 21, p 3360 (Verstrate et al.), both of which are incorporated herein by reference. For example, molecular weight may be determined by size exclusion chromatography (SEC) using a Waters 150 gel permeation chromatograph equipped with the differential refractive index detector and calibrated using polystyrene standards.

Suitable propylene copolymers for use in the adhesion layer of the multi-layer lamination composition employed herein are available commercially under the trade name Vistamaxx™ (ExxonMobil, Baytown Tex.). Suitable examples include: Vistamaxx™ 6202 resin and Vistamax™ 3980.

Although the adhesion layer may be composed substantially entirely of one or more propylene copolymers as described above, it is often desirable to produce the adhesion layer from a blend of the propylene copolymer with one or more further polymers. The one or more further polymers are referred to herein as "secondary polymers", although they may be present in the blend with the propylene-based copolymer in a majority or minority amount.

In one embodiment, the secondary polymer is an interpolymer of ethylene or propylene and a copolymerizable ester or acid-group containing monomer, such as an ethylene vinyl acetate, ethylene methyl acrylate, ethylene butyl acrylate, ethylene ethyl acrylate, ethylene acrylic acid or ethylene metacrylic acid copolymer or ionomer or terpolymer. Conveniently, said blend comprises from about 30 wt % to about 97 wt %, such as about 50 wt % to about 90 wt %, of such a secondary polymer.

In another embodiment, the secondary polymer may be low density polyethylene, a metallocene-based plastomer, such as Exact™ (ExxonMobil, Dexplastomer Geleen, Netherlands) 0210, linear polyethylene or polypropylene. Conveniently, said blend comprises from about 10 wt % to about 80 wt % of such a further polymer.

In other embodiments, the propylene-based copolymers described herein may be blended with one or more additives, either alone or in combination with the secondary polymer. One particularly, useful additive is a slip agent for reducing the coefficient of friction of the adhesion layer. Typically, such a slip agent is present in an amount of between about 500 ppm and about 1500 ppm of the adhesion layer. Preferably, the amount of slip agent added to the adhesion layer is such as to reduce to coefficient of friction of adhesion layer to less than 1.5.

Suitable additives include, but are not limited to, coagents, antioxidants, fillers, antiblocking agents, slip agents, release agents, antistatic agents, ultraviolet stabilizers, pigments, coloring agents, nucleating agents, fire or flame retardants, plasticizers, vulcanizing or curative agents, vulcanizing or curative accelerators, tackifiers, flow improvers, lubricants, mold release agents, foaming agents, reinforcers, and processing aids. The additives can be added to the blend in pure form or in master batches.

The multi-layer lamination composition material is generally produced by extruding a coating comprising the propylene-based copolymer as described herein onto at least one side of the base layer. The resultant adhesion layer normally exhibits sufficient adhesion to the base layer (typically in excess of 2N/15 mm) such that the application of a primer to the base layer is unnecessary. The amount of coating applied to the substrate is measured in grams per square meter, or gsm. In one or more embodiments, the coatings of the present invention are applied to the substrate in an amount of from about 8 to about 150 gsm, such as from about 10 to about 120 gsm, for example from about 10 to about 50 gsm.

The adhesion layer may be applied to the base layer as a monoextrusion. In a monoextrusion process, the adhesion layer is applied as a single layer. Alternatively, the adhesion layer may be applied to the base layer as a coextruded layer. In a coextrusion process, two or more layers are applied by extrusion at the same time onto base layer. A coating process may be used to apply a single layer of coating material on each side of a base layer simultaneously, or may be used to apply two or more layers of coating material on top of one another on a single side of the base layer. The coating layers applied in a coextrusion process may be the same or different, and one or both of the coextruded layers may comprise a propylene-based copolymer as described herein. For example, the base layer may be coextrusion coated with a first tie layer, which may or may not be a propylene-based copolymer, and with a second, outer adhesion layer comprising a propylene-based copolymer on top of the first tie layer. The tie layer is provided to enhance the adhesion between the base layer and the adhesion layer.

Production of the Laminated Article

The laminated articles as shown in FIGS. 1 to 3 are produced by juxtaposing the substrate 12 and one or more lamination compositions 15 such that the adhesion layer 17 of each lamination composition is disposed adjacent one major surface of the substrate 12. Heat and pressure is then applied to the assembly, generally by heated rollers, to cause the or each adhesion layer 17 to bond to the substrate 12 (FIGS. 1 and 2) or to cause the projecting peripheral portions of the adhesion layers to bond to each other (FIG. 3).

Generally, the adhesion layer, or each adhesion layer is subjected to corona discharge treatment prior to the thermal lamination step to assist in bonding the lamination composition to the substrate.

The invention will now be more particularly described with reference to the following Examples and FIGS. 4 to 7 of the accompanying drawings.

The different commercially available materials employed in the Examples are as follows:

Vistamaxx™ 6202 resin and Vistamaxx™ 3980 are copolymers of propylene with 15 wt % and 8.5 wt % ethylene respectively available from ExxonMobil Chemical Company.

Escorene™ Ultra EVA FL00714 is a hydrolyzed ethylene vinyl acetate copolymer having a melt index of 7.5 and vinyl acetate content of 14 wt % available from ExxonMobil Chemical Company.

Escorene™ Ultra EVA FL01418 is a hydrolyzed ethylene vinyl acetate copolymer having a melt index of 14 and vinyl acetate content of 18 wt % available from ExxonMobil Chemical Company.

Escor™ 5110 is an ethylene acrylic acide copolymer having a melt index of 12 and acrylic acid content of 11 wt % available from ExxonMobil Chemical Company.

Exxelor™ VA 1840 is a semi-crystalline ethylene copolymer functionalized with maleic anhydride available from ExxonMobil Chemical Company.

CRR 3371 and CRR 3973 are chill roll release masterbatches available from A. Schulman Inc.

FSU 105 is an LDPE-based masterbatch containing 10 wt % of an anti-block additive and 5 wt % of a slip agent and is available from A. Schulman, Inc.

The coefficient of friction (COF) data provided in the Examples were obtained using a test based on ASTM D-1894.

The bond strength data provided in the Examples were obtained using a test based on ASTM D-1876.

The hot tack strength data provided in the Examples were obtained using a test based on ASTM D-1921.

Examples 1 to 4

Four separate lamination compositions were prepared by coextruding onto one surface of an oriented polypropylene base layer (a) 8 gsm of an inner tie layer composed of Vistamaxx™ 6202 resin and (b) 16 gsm of an outer adhesion layer composed of Escorene™ Ultra EVA FL01418 either alone or blended with 7.5 wt % Vistamaxx™ 6202 resin and other optional additives. All the lamination compositions were corona discharge treated during the extrusion coating step.

The differing blends used in the adhesion layers were as follows:

Example 1 (Comparative)—Escorene™ Ultra EVA FL01418 alone;
Example 2 Escorene™ Ultra EVA FL01418+7.5 wt % Vistamaxx™ 6202 resin;
Example 3—Escorene™ Ultra EVA FL01418+7.5 wt % Vistamaxx™ 6202 resin+5 wt % CRR3973; and
Example 4—Escorene™ Ultra EVA FL01418+7.5 wt % Vistamaxx™ 6202 resin+1.6 wt % FSU 105.

The lamination compositions were thermally laminated to paper substrates having differently colored ink coatings. It is important that these lamination compositions adhere well to printed inks and therefore bonds were made between different printed colors. The printed paper used is typically used in the industry to test document plastification films. The printed paper and the laminating layer were brought in contact with each other and a bond was made by applying heat and pressure thereto. A J&B hot tack tester was used for this purpose varying the sealing temperature: seals were made at 100° C. and at 120° C. Other parameters that influence the sealing process were kept constant as follows: seal pressure: 0.5N/mm2; sealing time: 0.5 sec and sample width: 30 mm.

The bonds were separated at least 24 hrs after bonding using a Zwick tensile tester and force required to separate the bond is referred to as "bond strength". The 30 mm wide samples are cut back to 15 mm, so that the middle part of the produced seals are tested for bonding strength, therefore it is referred to as strength in N/15 mm. The adhesion between the coextruded polymeric layers and the OPP base films is 2.4 to 2.6 N/15 mm. The properties of the coextruded film and the laminated substrates are summarized in Table 1.

TABLE 1

| Example | 1 | 2 | 3 | 4 |
|---|---|---|---|---|
| Tie layer | Vistamaxx ™ 6202 resin | Vistamaxx ™ 6202 resin | Vistamaxx ™ 6202 resin | Vistamaxx ™ 6202 resin |
| Adhesion layer | FL01418 | FL01418 + 7.5% Vistamaxx ™ 6202 resin | FL01418 + 7.5% Vistamaxx ™ 6202 resin + 5% CRR3973 | FL01418 + 7.5% Vistamaxx ™ 6202 resin + 1.6% FSU105 |
| Adhesion force between based OPP film and coextruded coated layers (N/15 mm) | 2.4 | 2.6 | 2.6 | 2.5 |
| COF | | | | |
| Static | 1.8 | 2.27 | 1.5 | 2.2 |
| Kinetic | 1.9 | 2.2 | 1.1 | 2.1 |
| Bond strength to paper substrate (N/15 mm) at ° C. | | | | |
| black ink | | | | |
| 100° C. | 5.9 | 4.8 | | |
| 120° C. | 7.1 | 5.2 | | |
| fushia ink | | | | |
| 100° C. | 6.0 | 5.1 | | |
| 120° C. | 6.6 | 5.7 | | |
| blue ink | | | | |
| 100° C. | 6.6 | 5.1 | | |
| Hot tack strength (N/30 mm) at ° C. | | | | |
| 45 | | 0.2 | | |
| 50 | 0.9 | 0.9 | | |
| 55 | 1.2 | 1.3 | | |
| 60 | 1.8 | 1.7 | | |
| 65 | 2.6 | 2.5 | | |
| 70 | 3.3 | 3.7 | | |
| 75 | 5.1 | 5.8 | | |
| 80 | 5.8 | 6.5 | | |
| 85 | 5.4 | 6.0 | | |
| 90 | 4.6 | 4.8 | | |
| 95 | 4.0 | 4.3 | | |
| 100 | 2.9 | 3.9 | | |
| 105 | 2.6 | 3.0 | | |
| 110 | 2.1 | 2.6 | | |
| Clarity (%) | | | | |
| after melting up coating | 58 | 57 | | |

Examples 5 to 11

Seven separate lamination compositions were prepared by coextruding onto one surface of an oriented polypropylene base layer (a) 8 gsm of an inner tie layer composed of Vistamaxx™ 6202 resin and (b) 16 gsm of an outer adhesion layer composed of a blend of Escorene™ Ultra EVA FL01418 with 15 wt % Vistamaxx™ 6202 resin either alone or with other additives. All the lamination compositions were corona discharge treated during the extrusion coating step.

The differing blends used in the adhesion layers were as follows:
- Example 5—Escorene™ Ultra EVA FL01418+15 wt % Vistamaxx™ 6202 resin;
- Example 6—Escorene™ Ultra EVA FL01418+15 wt % Vistamaxx™ 6202 resin+5 wt % CRR3971;
- Example 7—Escorene™ Ultra EVA FL01418+15 wt % Vistamaxx™ 6202 resin+5 wt % CRR3973;
- Example 8—Escorene™ Ultra EVA FL01418+7.5 wt % Vistamaxx™ 6202 resin+5 wt % IL2580 cc;
- Example 9—Escorene™ Ultra EVA FL01418+7.5 wt % Vistamaxx™ 6202 resin+5 wt % IL10020 cc;
- Example 10—Escorene™ Ultra EVA FL01418+7.5 wt % Vistamaxx™ 6202 resin+3 wt % IL10020 cc+2 wt % CRR3971; and
- Example 11—Escorene™ Ultra EVA FL01418+15 wt % Vistamaxx™ 6202 resin+1.6 wt % FSU 105.

The lamination compositions were thermally laminated to paper substrates having differently colored ink coatings. The properties of the coextruded based films and the laminated substrates produced with the lamination compositions of Examples 5 and 6 are summarized in Table 2.

TABLE 2

| Example | 5 | 6 |
|---|---|---|
| Tie layer | Vistamaxx ™ 6202 resin | Vistamaxx ™ 6202 resin |
| Adhesion layer | FL01418 + 15 wt % Vistamaxx ™ 6202 resin | FL01418 + 15% Vistamaxx ™ 6202 resin + 5% CRR3971 |
| COF | | |
| Static | 2.6 | 1.9 |
| Kinetic | 2.3 | 1.9 |
| Bond strength (N/15 mm) at ° C. | | |
| black ink | | |
| 100° C. | 4.4 | 4.8 |
| 120° C. | 4.2 | 5.2 |
| fushia ink | | |
| 100° C. | 4.8 | 5.1 |
| 120° C. | 4.9 | 5.7 |
| blue ink | | |
| 100° C. | 4.7 | 5.1 |
| Hot tack (N/30 mm) at ° C. | | |
| 40 | 0.5 | 0.2 |
| 45 | 0.7 | 0.1 |
| 50 | 1.5 | 0.1 |
| 55 | 2.1 | 0.2 |
| 60 | 2.8 | 0.5 |
| 65 | 3.7 | 0.6 |
| 70 | 5.6 | 1.0 |
| 75 | 8.2 | 1.5 |
| 80 | 7.5 | 2.1 |
| 85 | 6.6 | 3.5 |
| 90 | 5.5 | 4.9 |
| 95 | 4.7 | 4.2 |
| 100 | 3.9 | 3.4 |
| 105 | N/A | 2.8 |
| 110 | 2.8 | 2.6 |
| Clarity (%) | | |
| after melting up coating | 50 | |

Examples 12 to 14

Three separate lamination compositions were prepared by coextruding onto one surface of an oriented polypropylene base layer (a) 8 gsm of an inner tie layer composed of Vistamaxx™ 6202 resin and (b) 16 gsm of an outer adhesion layer composed of a blend of Escorene™ Ultra EVA FL01418 with 25 wt % Vistamaxx™ 6202 resin either alone or with other additives. All the lamination compositions were corona discharge treated during the extrusion coating step.

The differing blends used in the adhesion layers were as follows:
- Example 12—Escorene™ Ultra EVA FL01418+25 wt % Vistamaxx™ 6202 resin;
- Example 13—Escorene™ Ultra EVA FL01418+25 wt % Vistamaxx™ 6202 resin+5 wt % CRR3973; and
- Example 14—Escorene™ Ultra EVA FL01418+25 wt % Vistamaxx™ 6202 resin+1.6 wt % FSU 105.

The lamination compositions were thermally laminated to paper substrates having differently colored ink coatings. The properties of the coextruded based films and the laminated substrates are summarized in Table 3.

TABLE 3

| Example | 12 | 13 | 14 |
|---|---|---|---|
| Tie layer | Vistamaxx ™ 6202 resin | Vistamaxx ™ 6202 resin | Vistamaxx ™ 6202 resin |
| Adhesion layer | FL01418 + 25 wt % Vistamaxx ™ 6202 resin | FL01418 + 25% Vistamaxx ™ 6202 resin + 5% CRR3973 | FL01418 + 25% Vistamaxx ™ 6202 resin + 1.6% FSU105 |
| COF | | | |
| Static | 2.9 | 2.5 | 2.8 |
| Kinetic | 2.0 | 1.0 | 2.4 |
| Bond strength (N/15 mm) at ° C. | | | |
| black ink | | | |
| 100° C. | 3.5 | | |
| 120° C. | 4.4 | | |
| fushia ink | | | |
| 100° C. | 4.8 | | |
| 120° C. | 4.6 | | |
| blue ink | | | |
| 100° C. | 4.5 | | |
| Hot tack (N/30 mm) at ° C. | | | |
| 35 | 0.7 | | |
| 40 | 1.2 | | 1.0 |
| 45 | 1.2 | 0.2 | 1.7 |
| 50 | 3.0 | 0.2 | 3.3 |
| 55 | 3.0 | 0.2 | 3.4 |
| 60 | 3.3 | 0.4 | 6.7 |
| 65 | 6.7 | 0.5 | 9.5 |
| 70 | 11.2 | 0.6 | 15.3 |
| 75 | 13.8 | 1.1 | 14.1 |
| 80 | 8.3 | 1.6 | 10.0 |
| 85 | 6.7 | 2.4 | 7.4 |
| 90 | 5.7 | 2.5 | 5.6 |
| 95 | 4.8 | 2.3 | N/A |
| 100 | 3.9 | 2.0 | 3.8 |
| 105 | N/A | 1.9 | N/A |
| 110 | 2.8 | 1.9 | 2.7 |
| Clarity (%) | | | |
| after melting up coating | 49 | | |

Examples 15 to 17

Three additional lamination compositions were prepared in a manner similar to the previous Examples but using Escorene™ Ultra EVA FL00714 in the thermal adhesive layer. In particular, the additional laminations were produced by coextruding onto one surface of an oriented polypropylene base layer (a) 8 gsm of an inner tie layer composed of Vistamaxx™ 6202 resin and (b) 16 gsm of an outer adhesion layer composed of a blend of Escorene™ Ultra EVA FL00714 with 15 wt % Vistamaxx™ 6202 resin and 5 wt % of CRR 3973 either alone or with other additives. All the lamination compositions were corona discharge treated during the extrusion coating step.

The differing blends used in the adhesion layers were as follows:

Example 15—Escorene™ Ultra EVA FL00714+15 wt % Vistamaxx™ 6202 resin+5 wt % CRR 3973;

Example 16—Escorene™ Ultra EVA FL00714+30 wt % Escor™ 5110+15 wt % Vistamaxx™ 6202 resin+5 wt % CRR 3973; and Example 17—Escorene™ Ultra EVA FL00714+30 wt % Exxelor™ polymer VA 1840+15 wt % Vistamaxx™ 6202 resin+5 wt % CRR 3973.

The lamination compositions were thermally laminated to paper substrates having differently colored ink coatings. The properties of the coextruded based films and the laminated substrates produced with the lamination compositions of Examples 5 and 6 are summarized in Table 4.

TABLE 4

| Example | 15 | 16 | 17 |
|---|---|---|---|
| Tie layer | Vistamaxx ™ 6202 resin | Vistamaxx ™ 6202 resin | Vistamaxx ™ 6202 resin |
| Adhesion layer | FL00714 + 15 wt % Vistamaxx ™ 6202 resin + 5% CRR3973 | FL00714 + 30% Escor ™ EAA 5110 + 25% Vistamaxx ™ 6202 resin + 5% CRR3973 | FL00714 + 30% Excelor ™ polymer VA1840 + 25% Vistamaxx ™ 6202 resin + 1.6% FSU105 |
| COF |  |  |  |
| Static | 1.6 | 1.5 | 1.7 |
| Kinetic | 1.1 | 1.1 | 1.4 |
| Bond strength (N/15 mm) at ° C. |  |  |  |
| black ink |  |  |  |
| 100° C. | 1.8 | 0.4 | 2.5 |
| 120° C. | 1.7 | 0.7 | 3.2 |
| fushia ink |  |  |  |
| 100° C. | 2.6 | 1.9 | 2.8 |
| 120° C. | 2.7 | 2.5 | 3.3 |
| blue ink |  |  |  |
| 100° C. | 2.2 | 1.7 | 2.8 |
| Hot tack (N/30 mm) at ° C. |  |  |  |
| 60 | 0.1 |  |  |
| 65 | 0.1 |  |  |
| 70 | 0.3 |  |  |
| 75 | 0.5 |  |  |
| 80 | 0.9 |  |  |
| 85 | 1.5 |  |  |
| 90 | 1.9 |  |  |
| 95 | 1.8 |  |  |
| 100 | 1.8 |  |  |
| 105 | 1.6 |  |  |
| 110 | 1.8 |  |  |

Evaluation of the Hot Tack Data of Examples 1 to 17

Figure 4:
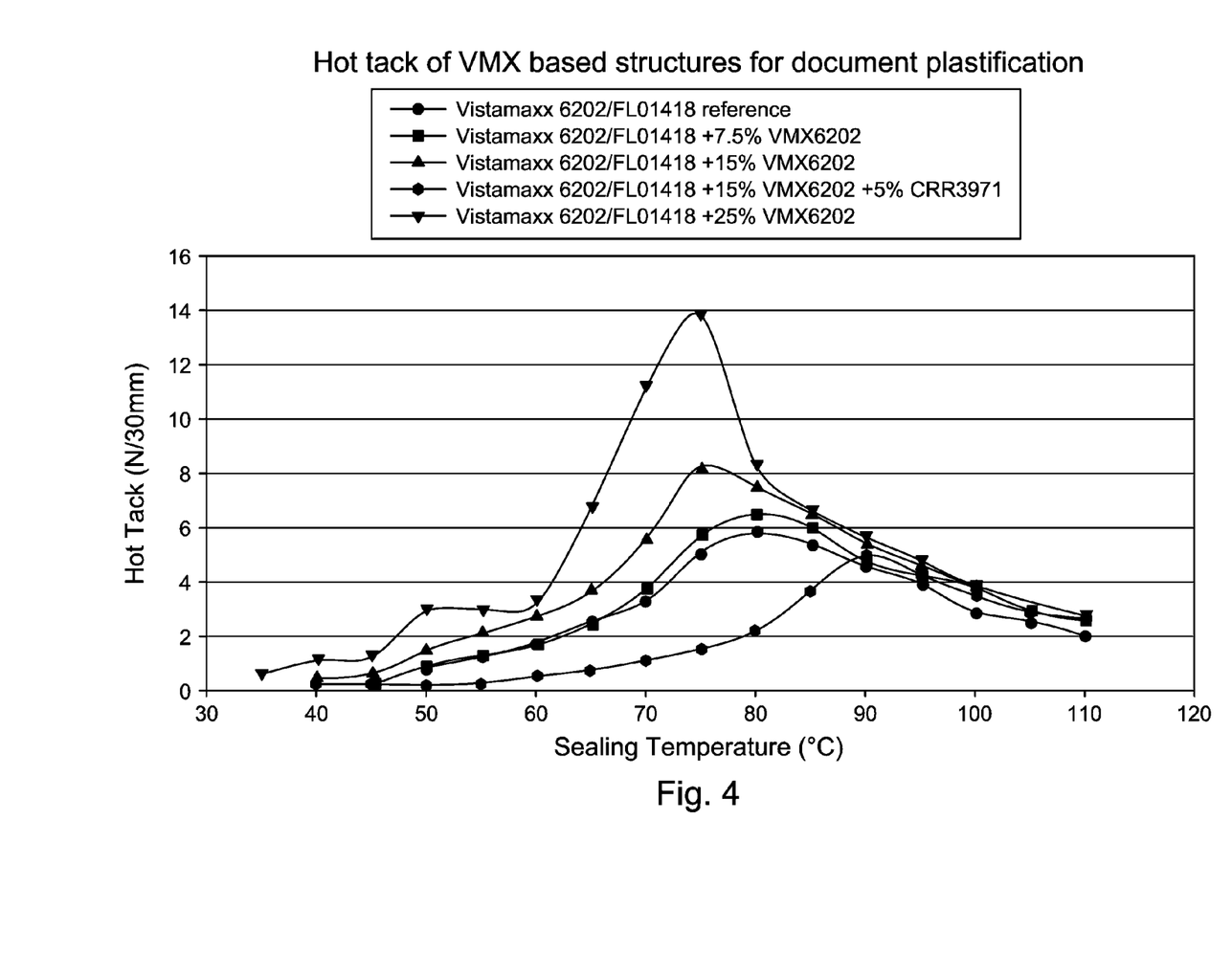
FIG. 4 is a graph of hot tack strength against sealing temperature for the laminated articles of Examples 1, 2, 5, 6 and 12.
Figure 5:
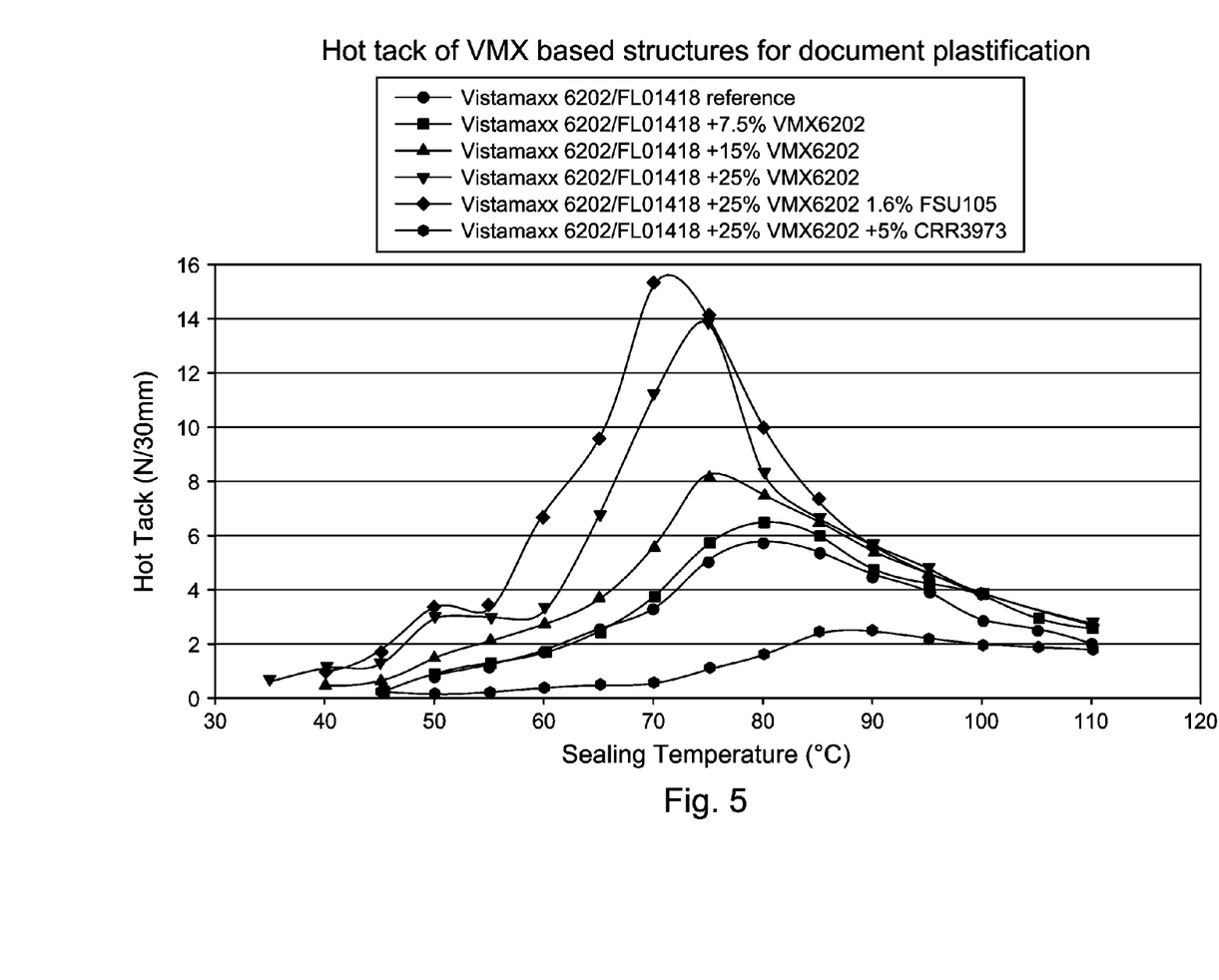
FIG. 5 is a graph of hot tack strength against sealing temperature for the laminated articles of Examples 1, 2, 5, 12, 13 and 14.
Figure 6:
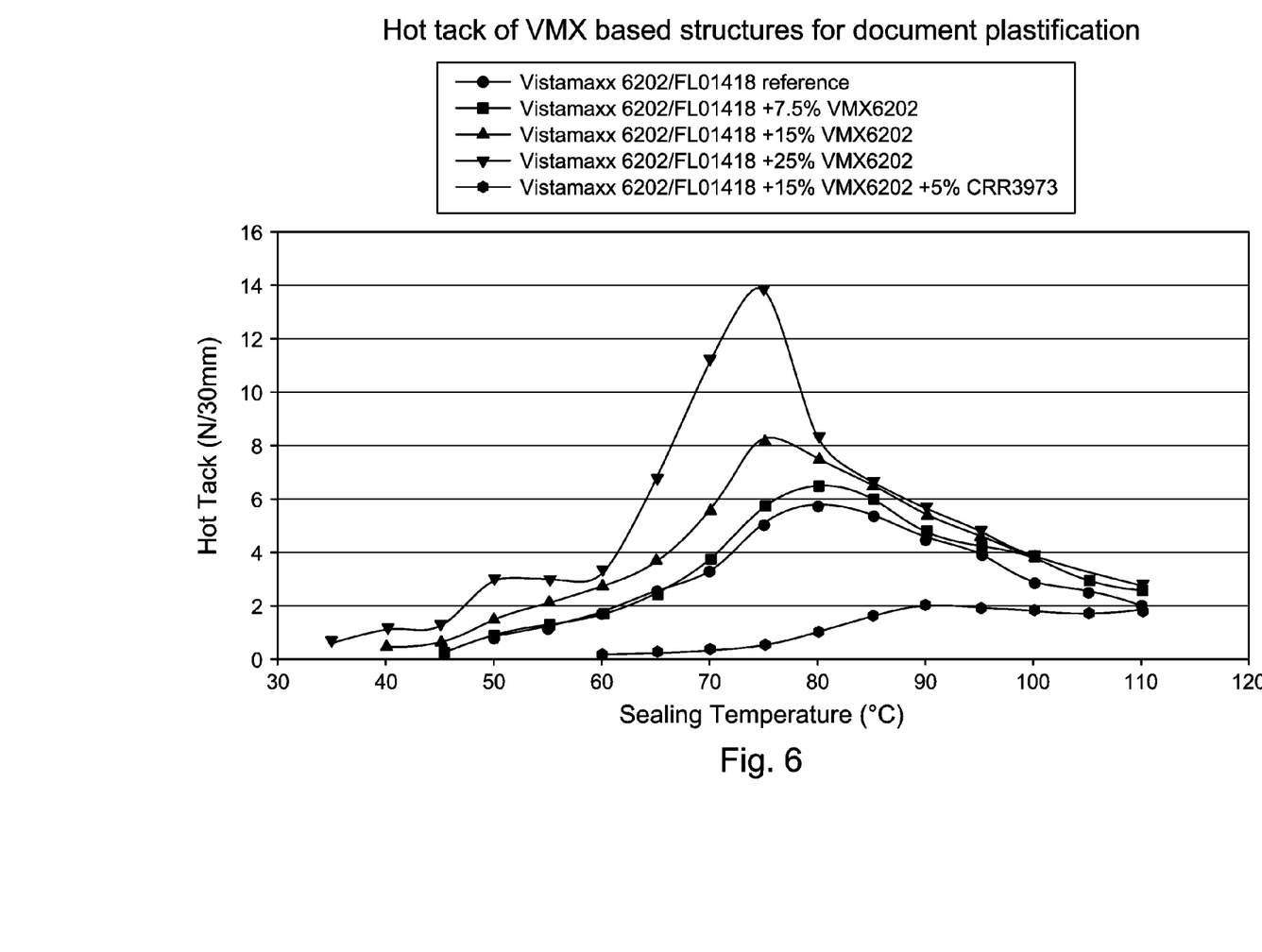
FIG. 6 is a graph of hot tack strength against sealing temperature for the laminated articles of Examples 1, 2, 5, 12 and 15.
Figure 7:
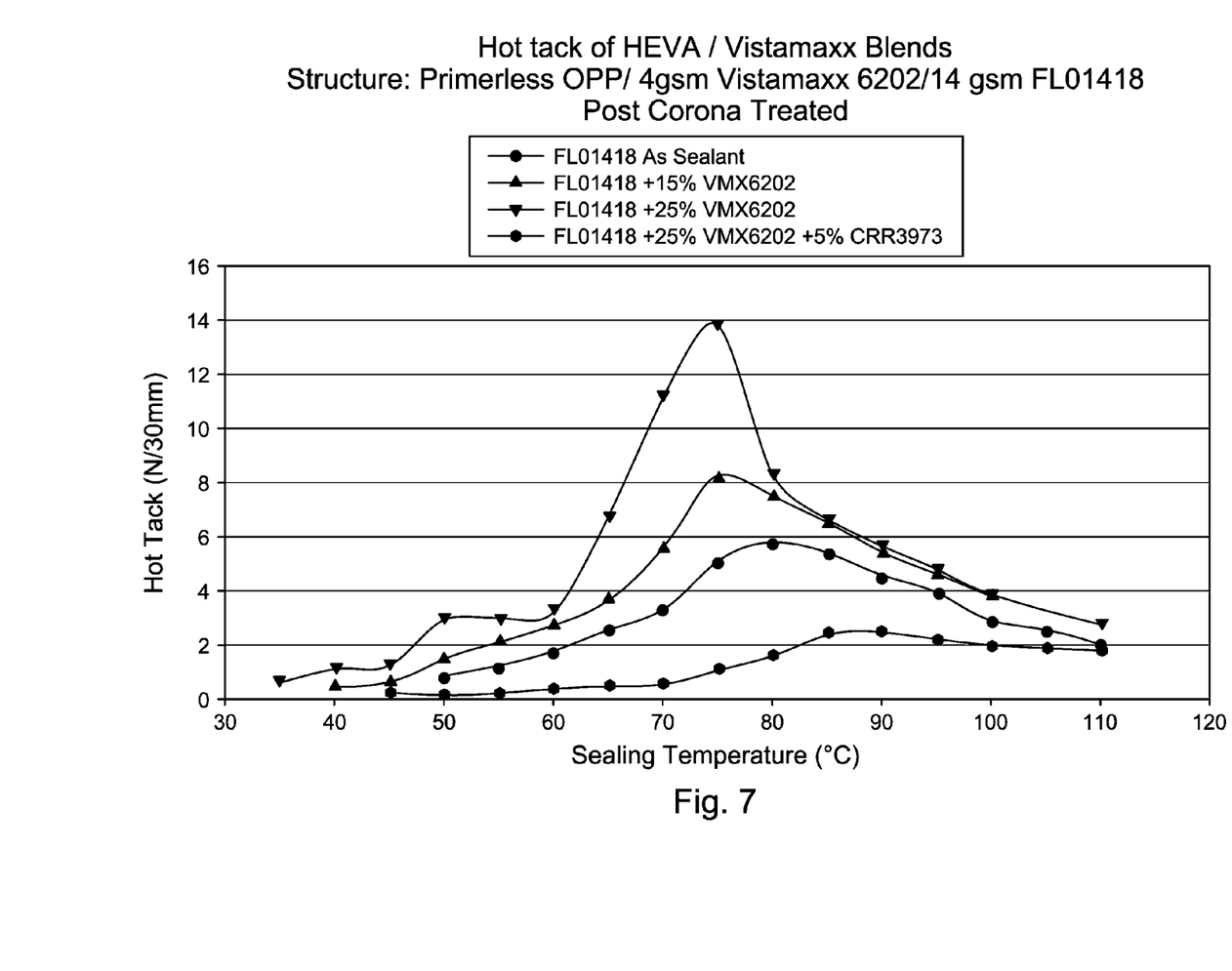
FIG. 7 is a graph of hot tack strength against sealing temperature for the laminated articles of Example 1.

The hot tack strength data of certain of the laminated articles produced in Examples 1 to 17 are summarized in FIGS. 4 to 6.

FIG. 4 is a graph of hot tack strength against sealing temperature for the coextruded base films of Examples 1, 2, 5, 6 and 12. The graph shows that the addition of an increasing amount of Vistamaxx™ 6202 resin in the Escorene™ Ultra EVA FL01418 (7.5 wt % in Example 2 to 15 wt % in Example 5 to 25 wt % in Example 12) to the Escorene™ Ultra EVA FL01418 adhesion layer of Example 1 resulted in a significant increase in the hot tack strength of the composition. In contrast, the addition of the chill roll release agent, CRR 3971, in addition to the Vistamaxx™ 6202 resin resulted in some decrease in the hot tack strength.

FIG. 5 is a graph of hot tack strength against sealing temperature for the films of Examples 1, 2, 5, 12, 13 and 14. The graph not only shows that the hot tack strength increased as the amount of Vistamaxx™ 6202 resin was increased from 7.5 to 25 wt %, but also shows that the addition of a small amount (1.6 wt %) of FSU 105 anti-block/slip agent to the 25 wt % Vistamaxx™ 6202 resin/Escorene™ Ultra EVA FL01418 blend (Example 14) has no impact on hot tack adhesion. In contrast, the addition of 5 wt % of the chill roll release agent, CRR 3973, to the 25 wt % Vistamaxx™ 6202 resin/Escorene™ Ultra EVA FL01418 blend (Example 13) resulted in a drastic decrease in the hot tack adhesion. Our hypothesis is that this is due to the post corona treatment.

FIG. 6 is a graph of hot tack against sealing temperature for the films of Examples 1, 2, 5, 12 and 15. The results are similar to those in FIG. 1, although in this case there was a more pronounced decrease in hot tack adhesion with the addition of 5 wt % of the chill roll release agent, CRR 3973, to the adhesion layer composed of a 15 wt % Vistamaxx™ 6202 resin/Escorene™ Ultra EVA FL00714 blend (Example 15).

The invention includes embodiments including but not limited to the following:

Embodiment 1

A laminated article comprising: (a) a substrate having opposite major surfaces, and (b) a multi-layer lamination composition comprising (i) a base layer and (ii) an adhesion layer disposed on at least one surface of the base layer, and the adhesion layer (ii) comprising a propylene copolymer which comprises units derived from propylene and from about 3 to about 25 wt % of units derived from ethylene and/or a $C_3$ to $C_8$ alpha-olefin and which has a melting temperature less than about 105° C. and a heat of fusion less than about 75 J/g, wherein the lamination composition (b) is thermally laminated to the substrate (a) such that said adhesion layer (ii) is bonded to at least one major surface of said substrate.

Embodiment 2

The article of embodiment 1, wherein the base layer (i) comprises an oriented polypropylene film or a polyester film.

Embodiment 3

The article of embodiment 1 or 2, wherein said adhesion layer (ii) is a monoextrusion layer or a coextrusion layer.

Embodiment 4

The article of any one of embodiments 1-3, wherein the propylene copolymer of said adhesion layer (ii) comprises from about 5 to about 15 wt % of units derived from ethylene.

Embodiment 5

The article of any one of embodiments 1-4, wherein the adhesion layer (ii) comprises a blend of said propylene copolymer with at least one further polymer selected from an ethylene vinyl acetate, ethylene methyl acrylate, ethylene butyl acrylate, ethylene ethyl acrylate, ethylene acrylic acid or ethylene metacrylic acid copolymer or ionomer or terpolymer.

Embodiment 6

The article of embodiment 5, wherein said blend comprises from about 30 wt % to about 97 wt % of said further polymer.

Embodiment 7

The article of any one of embodiments 1-6, wherein the adhesion layer (ii) comprises a blend of said propylene copolymer with at least one further polymer selected from low density polyethylene, a metallocene-based plastomer, linear polyethylene or polypropylene.

Embodiment 8

The article of embodiment 8, wherein said blend comprises from about 10 wt % to about 80 wt % of said further polymer.

Embodiment 9

The article of any one of embodiments 1-8, wherein the adhesion is layer (ii) comprises a friction reducing additive in an amount between about 500 ppm and about 1500 ppm of said adhesion layer.

Embodiment 10

The article of any one of embodiments 1-9, wherein the lamination composition (b) is corona discharge treated prior to being thermally laminated to the substrate (a).

Embodiment 11

The article of any one of embodiments 1-10, wherein the substrate is a document having information disposed on said at least one major surface.

Embodiment 12

The article of any one of embodiments 1-11, wherein the lamination composition (b) is transparent after the thermal lamination step.

Embodiment 13

A laminated article comprising: (a) a substrate having opposite major surfaces, and (b) first and second multi-layer lamination compositions each comprising (i) a base layer and (ii) an adhesion layer disposed on at least one surface of the base layer, the adhesion layer (ii) comprising a propylene copolymer which comprises units derived from propylene and from about 3 to about 25 wt % of units derived from ethylene and/or a $C_3$ to $C_8$ alpha-olefin and which has a melting temperature less than about 105° C. and a heat of fusion less than about 75 J/g, wherein the substrate (a) is interposed between the first and second lamination compositions and the lamination compositions (b) are thermally laminated to each other and/or the substrate (a) such that the adhesion layers (ii) are bonded to said one major surfaces respectively of said substrate and/or to each other.

Embodiment 14

The article of embodiment 13, wherein the base layer (i) comprises an oriented polypropylene film or a polyester film.

Embodiment 15

The article of embodiment 13 or 14, wherein each adhesion layer (ii) is a monoextrusion layer or a coextrusion layer.

Embodiment 16

The article of any one of embodiments 13-15, wherein the propylene copolymer of each adhesion layer (ii) comprises from about 5 to about 15 wt % of units derived from ethylene.

Embodiment 17

The article of any one of embodiments 13-16, wherein each adhesion layer (ii) comprises a blend of said propylene copolymer with at least one further polymer selected from an ethylene vinyl acetate, ethylene methyl acrylate, ethylene butyl acrylate, ethylene ethyl acrylate, ethylene acrylic acid or ethylene metacrylic acid copolymer or ionomer or terpolymer.

Embodiment 18

The article of embodiment 17, wherein said blend comprises from about 30 wt % to about 97 wt % of said further polymer.

Embodiment 19

The article of any one of embodiments 13-18, wherein each adhesion layer (ii) comprises a blend of said propylene copolymer with at least one further polymer selected from low density polyethylene, a metallocene-based plastomer, linear polyethylene or polypropylene.

Embodiment 20

The article of embodiment 19, wherein said blend comprises from about 10 wt % to about 80 wt % of said further polymer.

Embodiment 21

The article of any one of embodiments 13-20, wherein the adhesion layer (ii) comprises a friction reducing additive in an amount between about 500 ppm and about 1500 ppm of said adhesion layer.

Embodiment 22

The article of any one of claims 13-21, wherein the base layer (i) and adhesion layer (ii) are corona discharge treated prior to or simultaneously with the bonding of said layers.

Embodiment 23

The article of any one of embodiments 13-22, wherein the substrate is a document having information disposed on said at least one major surface.

Embodiment 24

The article of any one of embodiments 13-23, wherein each lamination composition (b) is transparent after the thermal lamination step.

Embodiment 25

A process for producing a laminated article, the process comprising: (a) providing a substrate having opposite major surfaces, (b) providing a multi-layer lamination composition comprising (i) a base layer and (ii) an adhesion layer disposed on at least one surface of the base layer, the adhesion layer (ii) comprising a propylene copolymer which comprises units derived from propylene and from about 3 to about 25 wt % of units derived from ethylene and/or a $C_3$ to $C_8$ alpha-olefin and which has a melting temperature less than about 105° C. and a heat of fusion less than about 75 J/g; and (c) with the adhesion layer (ii) of said lamination composition disposed in contact with at least one major surface of said substrate, applying heat and pressure to said lamination composition to cause said adhesion layer to bond to the substrate and thereby thermally laminate the substrate and the lamination composition.

Embodiment 26

The process of embodiment 25, wherein the base layer (i) comprises an oriented polypropylene film or a polyester film.

Embodiment 27

The process of embodiment 25 or 26, wherein the propylene copolymer of said adhesion layer (ii) comprises from about 5 to about 15 wt % of units derived from ethylene.

Embodiment 28

The process of any one of embodiments 25-27, wherein the adhesion layer (ii) comprises a blend of said propylene copolymer with an ethylene vinyl acetate, or ethylene methyl acrylate, or ethylene butyl acrylate, or ethylene ethyl acrylate or ethylene acrylic acid copolymer, or ethylene metacrylic acid copolymer or ionomer or terpolymer.

Embodiment 29

The process of any one of embodiments 25-28, wherein the adhesion layer (ii) comprises a blend of said propylene copolymer with at least one further polymer selected from low density polyethylene, a metallocene-based plastomer, linear polyethylene or polypropylene.

Embodiment 30

The process of any one of embodiments 25-29 and further comprising subjecting the adhesion layer (ii) of said lamination composition to corona discharge treatment prior to step (c).

Embodiment 31

A process for producing a laminated article, the process comprising: (a) providing a substrate having opposite major surfaces; (b) providing first and second multi-layer lamination compositions each comprising (i) a base layer and (ii) an adhesion layer disposed on at least one surface of the base layer, the adhesion layer (ii) comprising a propylene copolymer which comprises units derived from propylene and from about 3 to about 25 wt % of units derived from ethylene and/or a $C_3$ to $C_8$ alpha-olefin and which has a melting temperature less than about 105° C. and a heat of fusion less than about 75 J/g; (c) interposing the substrate between the first and second multi-layer lamination compositions with the adhesion layers (ii) of the lamination compositions disposed in contact with the opposite major surfaces of said substrate; (d) applying heat and pressure to said lamination compositions to cause said adhesion layers to bond to the substrate and thereby thermally laminate the substrate and the lamination compositions.

Embodiment 32

The process of embodiment 31, wherein each base layer (i) comprises an oriented polypropylene film or a polyester film.

Embodiment 33

The process of embodiment 31 or 32, wherein the propylene copolymer of each adhesion layer (ii) comprises from about 5 to about 15 wt % of units derived from ethylene.

Embodiment 34

The process of any one of embodiments 31-33, wherein each adhesion layer (ii) comprises a blend of said propylene copolymer with an ethylene vinyl acetate, or ethylene methyl acrylate, or ethylene butyl acrylate, or ethylene ethyl acrylate or ethylene acrylic acid copolymer, or ethylene metacrylic acid copolymer or ionomer or terpolymer.

Embodiment 35

The process of any one of embodiments 31-34, wherein each adhesion layer (ii) comprises a blend of said propylene copolymer with at least one further polymer selected from low density polyethylene, a metallocene-based plastomer, linear polyethylene or polypropylene.

Embodiment 36

The process of any one of embodiments 31-35 and further comprising subjecting the adhesion layer (ii) of each lamination composition to corona discharge treatment prior to step (d).

Embodiment 37

A process for producing a laminated article, the process comprising: (a) providing a substrate having opposite major surfaces, (b) providing first and second multi-layer lamination compositions each comprising (i) a base layer and (ii) an adhesion layer disposed on at least one surface of the base layer, the adhesion layer (ii) comprising a propylene copolymer which comprises units derived from propylene and from about 3 to about 25 wt % of units derived from ethylene and/or a $C_3$ to $C_8$ alpha-olefin and which has a melting temperature less than about 105° C. and a heat of fusion less than about 75 J/g; (c) interposing the substrate between the first and second multi-layer lamination compositions with the adhesion layers (ii) of the lamination compositions disposed adjacent, but extending at their periphery beyond, the opposite major surfaces of said substrate; (d) applying heat and pressure to at least the peripheral portions of the lamination compositions to cause said adhesion layers (ii) to bond to each other and encapsulate the substrate.

Embodiment 38

The process of embodiment 37, wherein each base layer (i) comprises an oriented polypropylene film or a polyester film.

Embodiment 39

The process of embodiment 37 or 38, wherein the propylene copolymer of each adhesion layer (ii) comprises from about 5 to about 15 wt % of units derived from ethylene.

Embodiment 40

The process of any one of embodiments 37-39, wherein each adhesion layer (ii) comprises a blend of said propylene copolymer with an ethylene vinyl acetate, or ethylene methyl acrylate, or ethylene butyl acrylate, or ethylene ethyl acrylate or ethylene acrylic acid copolymer, or ethylene metacrylic acid copolymer or ionomer or terpolymer.

Embodiment 41

The process of any one of embodiments 37-40, wherein each adhesion layer (ii) comprises a blend of said propylene copolymer with at least one further polymer selected from low density polyethylene, a metallocene-based plastomer, linear polyethylene or polypropylene.

Embodiment 42

The process of any one of embodiments 37-41 and further comprising subjecting the adhesion layer (ii) of each lamination composition to corona discharge treatment prior to step (d).

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A laminated article comprising:
    (a) a substrate having opposite major surfaces, and
    (b) a first multi-layer lamination composition comprising (i) a first base layer and (ii) a first adhesion layer disposed on at least one surface of the base layer, the first adhesion layer comprising:
        1) from about 92.5 wt % to about 75 wt % ethylene vinyl acetate, based upon the total weight of the first adhesion layer, wherein the ethylene vinyl acetate has melt index (2.16 kg @190° C.) of about 14 g/10 min and a vinyl acetate content of about 18 wt %, and
        2) from about 7.5 wt % to about 25 wt % of a propylene copolymer, based upon the total weight of the first adhesion layer, that consists essentially of units derived from propylene and about 15 wt % of units derived from ethylene, and wherein the propylene copolymer has a melting temperature less than about 105° C., a heat of fusion less than about 75 J/g, a triad tacticity of three propylene units, as measured by $^{13}$C NMR, of 75% or greater, a crystallinity of from about 0.5 to about 40%, and a melt index (2.16 kg @190° C.) of about 9.1 g/10 min, and
    wherein the first lamination composition is thermally laminated to the substrate such that said first adhesion layer is bonded to at least one major surface of said substrate.

2. The article of claim 1, wherein the base layer (i) comprises an oriented polypropylene film or a polyester film.

3. The article of claim 1, wherein said adhesion layer (ii) is a monoextrusion or a coextrusion layer.

4. The article of claim 1, wherein the adhesion layer (ii) comprises a blend of said propylene copolymer with at least one further polymer selected from low density polyethylene, a metallocene-based plastomer, linear polyethylene or polypropylene.

5. The article of claim 1, wherein the adhesion layer (ii) comprises a friction reducing additive in an amount between about 500 ppm and about 1500 ppm of said adhesion layer.

6. The article of claim 1, wherein the lamination composition (b) is corona discharge treated prior to being thermally laminated to the substrate (a).

7. The article of claim 1, wherein the substrate is a document having information disposed on said at least one major surface.

8. The article of claim 1, wherein the lamination composition (b) is transparent after the thermal lamination step.

9. The article of claim 1, wherein element (b) further comprises a second multi-layer lamination composition comprising (i) a second base layer and (ii) a second adhesion layer disposed on at least one surface of the second base layer, the second adhesion layer comprising a propylene copolymer which consists essentially of units derived from propylene and about 15 wt % of units derived from ethylene and which has a melting temperature less than about 105° C. and a heat of fusion less than about 75 J/g, and the second lamination composition is thermally laminated to the first lamination composition and/or the substrate such that the adhesion layers are bonded to said major surfaces respectively of said substrate and/or to each other.

10. The article of claim 1, wherein the first adhesion layer comprises from about 15 wt % to about 25 wt % of the propylene copolymer, based upon the total weight of the first adhesion layer.

11. The article of claim 1, wherein the first adhesion layer comprises about 25 wt % of the propylene copolymer, based upon the total weight of the first adhesion layer.

* * * * *